United States Patent
Unno et al.

(10) Patent No.: US 6,501,574 B1
(45) Date of Patent: Dec. 31, 2002

(54) OPTICAL MULTIPLEX TRANSMISSION APPARATUS AND OPTICAL MULTIPLEX TRANSMISSION METHOD

(75) Inventors: Kazuyoshi Unno, Shizuoka-ken (JP); Akiyoshi Tomita, Shizuoka-ken (JP); Hiroshi Nishiyama, Shizuoka-ken (JP); Akira Norizuki, Shizuoka-ken (JP); Katsutoshi Nakajima, Shizuoka-ken (JP); Yoshikazu Saito, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/366,723

(22) Filed: Aug. 4, 1999

(30) Foreign Application Priority Data

Aug. 5, 1998 (JP) .......................................... 10-221935

(51) Int. Cl.[7] ............................................... H04J 14/00
(52) U.S. Cl. ..................... 359/115; 359/119; 359/164; 359/167
(58) Field of Search ................................ 359/115, 119, 359/164, 167

(56) References Cited

U.S. PATENT DOCUMENTS 5,387,993 A * 2/1995 Heller et al. ................ 359/155
5,914,796 A * 6/1999 Selin ........................... 359/136

FOREIGN PATENT DOCUMENTS

JP 32018 * 1/2000
JP 59409 * 2/2000

* cited by examiner

Primary Examiner—Thomas Mullen
(74) Attorney, Agent, or Firm—Finnegan, Henderson, Farabow, Garrett, & Dunner, L.L.P.

(57) ABSTRACT

In each control node connected to an optical multiplex transmission path, a light receiving portion operates due to supply of a power source and receives an optical signal from another control node. A mode changing-over portion alternately changes over a multiplex communication mode and a sleep mode every prescribed period of time. A light receiving power source control portion and a first switch have alternately repeated therein a power source supply time length corresponding substantially to the multiplex communication mode during which a power source is supplied and a power source non-supply time length corresponding substantially to the sleep mode during which no power source is supplied, and thereby produces a power source supply pulse signal in which the duty ratio between the power source supply time length and the power source non-supply time length is preset and supplies this power source supply pulse signal to the light receiving portion. When the mode changing-over portion changes over the mode of the control node from the sleep mode to the multiplex communication mode and the light receiving portion has received the light signal, the mode changing-over portion causes the multiplex communication mode to be maintained during a time period in which the light signal is being received, and the light reception control portion causes the power source to continue to be supplied to the light receiving portion during a time period in which the light signal is being received.

12 Claims, 7 Drawing Sheets

OPTICAL MULTIPLEX TRANSMISSION APPARATUS AND OPTICAL MULTIPLEX TRANSMISSION METHOD

BACKGROUND OF THE INVENTION

1. Field of the Invention

The present invention relates to an optical multiplex transmission apparatus and an optical multiplex transmission method, which enable each of a plurality of control nodes connected to a common optical multiplex transmission path to have its operation mode changed over to a multiplex communication mode wherein the control node performs multiplex communication through an interface for use on multiplex transmission, that is provided to this control node, and to a sleep mode wherein this interface is kept inoperative. More particularly, the invention concerns an optical multiplex transmission apparatus and an optical multiplex transmission method, which can be simplified by changing over the control node from the sleep mode to the multiplex communication mode without providing a wake-up signal electric wire.

2. Related Art

An optical multiplex transmission apparatus for performing multiplex communication has recently been loaded on a vehicle. This optical multiplex transmission apparatus is constructed by a plurality of control nodes being connected to a common optical multiplex transmission path such as an optical fiber.

Each control node has provided therein a multiplex communication interface for performing multiplexing of data and thereby performing transmission and reception thereof, whereby transmission and reception of data are done between microcontrollers provided in the respective control nodes through the multiplex interface and optical multiplex transmission path.

Also, in order to suppress the power consumption maximally, each control node has a change-over function for changing over the mode thereof to a multiplex communication mode for performing multiplex communication through the multiplex transmission interface and to a sleep mode for causing the multiplex transmission interface to be kept inoperative and thereby causing a decrease in the current consumption.

At an ordinary time, the control node is operated in the sleep mode to thereby suppress useless power consumption. When prescribed starting conditions have been satisfied, the mode of the control node is changed over, by a wake-up signal, to the multiplex communication mode in which the operational condition of the microcontroller is made "on" through the multiplex transmission interface.

FIG. 1 is a block diagram illustrating the construction of a type of conventional optical multiplex transmission apparatus. In the optical multiplex transmission apparatus illustrated in FIG. 1, it is arranged that a master node 101 serving as a control node and a plurality of slave nodes 102a to 102n controlled by this master node 101 are connected in the form of a ring by an optical multiplex transmission path 103 (103a to 103n) such as an optical fiber, whereby a multiplex communication signal is transmitted in the direction indicated by the arrows.

It is to be noted that in each node Rx represents the reception of a multiplex communication signal and Tx represents the transmission of a multiplex communication signal. Also, a wake-up signal electric wire 104 for transmitting a wake-up signal from the master node 101 to the slave nodes 102a to 102n is provided.

As described above, the wake-up signal electric wire 104 is provided separately from the optical multiplex transmission path 103 that is a data transmission line. At the time of activation after turning on a main power source, a given node, for example, a master node 101, transmits a wake-up signal to all the slave nodes 102a to 102n through the wake-up signal electric wire 104. Upon receipt of the wake-up signal, each slave node 102a to 102n changes over the interface portion from the sleep mode to the multiplex communication mode.

In this way, every one of the slave nodes 102a to 102n is transferred from the sleep mode to the multiplex communication mode, and then bi-directional communication can be made between each node through the optical multiplex transmission path 103.

However, in the conventional optical multiplex transmission apparatus, although the slave nodes can be stably activated by using a wake-up signal, the wake-up signal electric wire had to be provided separately from the optical multiplex transmission path that is a data transmission line.

Providing this wake-up signal electric wire is due to the following reason. In the sleep mode, the current consumption is appreciably limited. Therefore, in a case where having used the optical multiplex transmission path, the power source of a light receiving portion must be made "off" in order that the apparatus may be in sleep mode.

For this reason, in order to activate from the sleep mode, as illustrated in FIG. 2, separately from optical interfaces (optical IFs) 106a, 106b of, for example, a light receiving portion, etc., the wake-up signal electric wire, i.e., electric interfaces (electric IFs) 107a, 107b were provided, whereby the apparatus was activated from the sleep mode by using a wake-up signal which is a kind of electric signal. Therefore, there was the problem that the wire reduction effect resulting from the multiplex communication was impaired. In addition, the wiring or distribution of the wake-up signal electric wire became complex or costly.

SUMMARY OF THE INVENTION

An object of the present invention is to provide an optical multiplex transmission apparatus and optical multiplex transmission method which enable the system to be simplified, and enable each control node to be activated and commence its communication, without providing any wake-up signal electric wire separately from a data transmission line.

To attain the above object, there is provided an optical multiplex transmission apparatus wherein a plurality of control nodes are connected to an optical multiplex transmission path; and each control node performs communication, through a multiplex communication portion for use in multiplex transmission that has been provided therein, with another control node, the each control node comprising: a light receiving portion that operates by having a power source signal supplied thereto and receives an optical signal from the another control node; a mode changing-over portion that alternately changes over the mode of the control node between a multiplex communication mode for performing multiplex communication and a sleep mode in which the multiplex communication portion is kept inoperative every prescribed period of time; and a light reception control portion that has alternately repeated therein a power source supply time length corresponding to the multiplex communication mode during which the power source is supplied and a power source non-supply time length corresponding to the sleep mode during which the power source is not supplied, and that produces a power source supply pulse signal wherein a duty ratio between the power source supply time length and the power source non-supply time length is preset and supplies the power source supply pulse signal to the light receiving portion, whereby when the mode changing-over portion changes over the mode of the control node from the sleep mode to the multiplex communication mode and the light receiving portion has received a light signal, the mode changing-over portion causes the multiplex communication mode to be maintained while the light signal is being received, and the light reception control portion causes the power source to continue to be supplied to the light receiving portion while the light signal is being received.

According to this invention, the multiplex communication mode and sleep mode are alternately repeated every prescribed period of time and the power source supply pulse signal having a preset duty ratio is supplied to the light receiving portion. Therefore, the current consumption that is made during the sleep mode is suppressed to a value that falls within a permissible range. Further, when the mode of the control node has been changed over from the sleep mode to the multiplex communication mode and the light signal has been received, the multiplex communication mode is caused to continue to be as is and the supply of the power source to the light receiving portion is caused to continue to be made, whereby it is possible to activate the control node from the sleep mode. This makes it unnecessary to provide a wake-up signal electric wire separately from the optical multiplex transmission path and therefore makes it possible to simplify the system.

In a preferred embodiment of the present invention, after the mode changing-over portion has changed over the mode of the control node from the sleep mode to the multiplex communication mode, the light reception control portion supplies the power source to the light receiving portion during, and by, the power source supply time length according to the power source supply pulse signal.

According to this embodiment, the light reception control portion supplies, after the mode has been changed over from the sleep mode to the multiplex communication mode, the power source to the light receiving portion during, and by, the power source supply time length according to the power source signal, with the result that it is possible to make the duty ratio low and so to decrease the current consumption.

In a preferred embodiment of the present invention, upon receiving no light signal from the other control node, the light reception control portion, before change-over from the multiplex communication mode to the sleep mode, stops the supply of the power source to the light receiving portion during, and by, the power source non-supply time length according to the power source supply pulse signal.

According to this embodiment, upon receiving no light signal from the another control node, the light reception control portion, before change-over from the multiplex communication mode to the sleep mode, stops the supply of the power source to the light receiving portion during, and by, the power non-supply time length according to the power source supply pulse signal. Therefore, the duty ratio can be made low and so the current consumption can be decreased.

In a preferred embodiment of the present invention, the optical multiplex transmission apparatus further comprises a multiplex communication control portion which determines whether the light receiving portion has received the light signal and, when the light signal has been received thereby, causes the supply of the power source to the multiplex communication portion and, when no light signal has been received thereby, stops the supply of the power source to the multiplex communication portion.

According to this embodiment, the multiplex communication control portion, when the light signal has been received thereby, causes the supply of the power source to the multiplex communication portion and, when no light signal has been received thereby, stops the supply of the power source to the multiplex communication portion. Therefore, since no current is caused to flow into the multiplex communication portion, it is possible to largely decrease the current consumption in a state prior to the start made from the sleep mode. As a result, since the duty ratio can be made high by the extent to which the current consumption of the multiplex communication portion has been able to be decreased, the activation responsivity becomes high.

In a preferred embodiment of the present invention, the multiplex communication control portion comprises: a reception determining portion for determining whether the light receiving portion has received the light signal; a switch for, when the light receiving portion has received the light signal, permitting the supply of the power source to the multiplex communication portion according to a control signal from the reception determining portion; and a gate for, when the light receiving portion has received the light signal, permitting the light signal output from the light receiving portion to be input to the multiplex communication portion according to the control signal from the reception determining portion.

According to this embodiment, when the light receiving portion has received the light signal, the power source is supplied to the multiplex communication portion and the light signal output from the light receiving portion is input to the multiplex communication portion. Therefore, since the duty ratio can be made high by the extent to which the current consumption of the multiplex communication portion has been able to be decreased, the activation responsivity becomes high.

In a preferred embodiment of the present invention, the plurality of the control nodes are connected to one another by the optical multiplex transmission path in the form of a ring.

According to this embodiment, the plurality of the control nodes are connected to one another in the form of a ring by the optical multiplex transmission path. Therefore, even when a part of the optical multiplex transmission path is broken, all of the control nodes can be activated if transmitting a wake-up signal in an opposite direction. Also, since in a ring type network each control node is sequentially activated from the sleep mode, there is the merit that if the activation responsivity in each of the individual control nodes becomes high, the activation responsivity in the entire network becomes also high.

Further, to attain the above object, there is provided an optical multiplex transmission method wherein a plurality of control nodes are connected to an optical multiplex transmission path; and each control node performs communication, through a multiplex communication portion for use in multiplex transmission that has been provided therein, with another control node, the method comprising the steps of: alternately changing over the mode of the control node between a multiplex communication mode for performing multiplex communication and a sleep mode in which the multiplex communication portion is kept inoperative every prescribed period of time; alternately repeating a power source supply time length corresponding to the multiplex communication mode during which the power source is supplied and a power source non-supply time length corresponding to the sleep mode during which the power source is not supplied, and producing a power source supply pulse signal wherein the duty ratio between the power source supply time length and the power source non-supply time length is preset and supplying the power source supply pulse signal to a light receiving portion; and causing a continuation of the multiplex communication mode during a reception of the light signal and causing a continuation of the supply of the power source to the light receiving portion during the reception of the light signal, when the mode of the control node has been changed over from the sleep mode to the multiplex communication mode and the light receiving portion has received the light signal.

In a preferred embodiment of the present invention, after the mode changing-over portion has changed over the mode of the control node from the sleep mode to the multiplex communication mode, the power source is supplied to the light receiving portion during, and by, the power source supply time length according to the power source supply pulse signal.

In a preferred embodiment of the present invention, when the light receiving portion receives no light signal from the other control node, the supply of the power source to the light receiving portion is stopped during, and by, the power source non-supply time length according to the power source supply pulse signal before change-over from the multiplex communication mode to the sleep mode.

In a preferred embodiment of the present invention, a determination is made of whether the light receiving portion has received the light signal and, when the light signal has been received thereby, the supply of the power source to the multiplex communication portion is made and, when no light signal has been received thereby, the supply of the power source to the multiplex communication portion is stopped.

In a preferred embodiment of the present invention, when the light signal has been received, the light signal output from the light receiving portion is input to the multiplex communication portion.

In a preferred embodiment of the present invention, the plurality of the control nodes are connected to one another by the optical multiplex transmission path in the form of a ring.

The nature, principle and utility of the invention will become more apparent from the following detailed description when read in conjunction with the accompanying drawings.

DESCRIPTION OF THE PREFERRED EMBODIMENTS

An embodiment of an optical multiplex transmission apparatus and optical multiplex transmission method of the present invention will now be explained in detail with reference to the drawings.

First Embodiment

Figure 1:
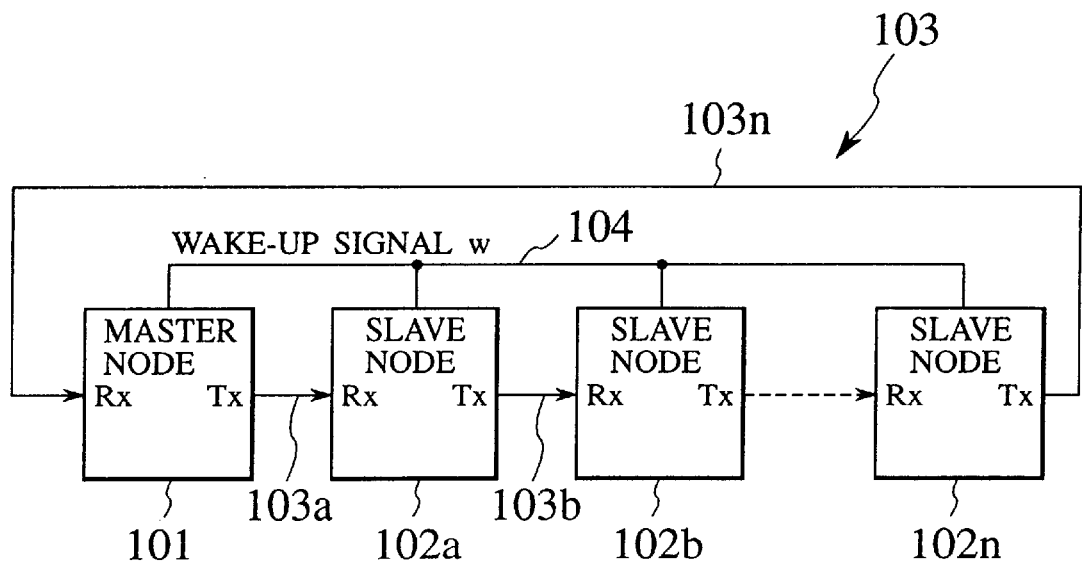
FIG. 1 is a block diagram illustrating the construction of an example of a conventional optical multiplex transmission apparatus.
Figure 2:
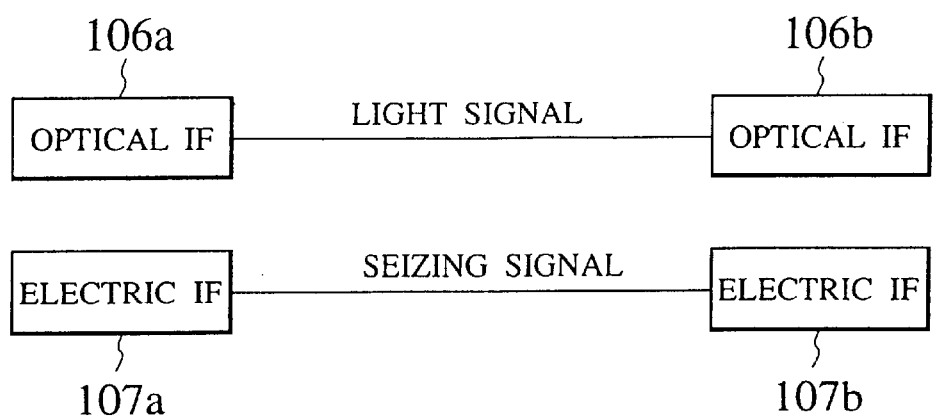
FIG. 2 illustrates optical interfaces and electric interfaces that are provided in the conventional optical multiplex transmission apparatus.
Figure 3:
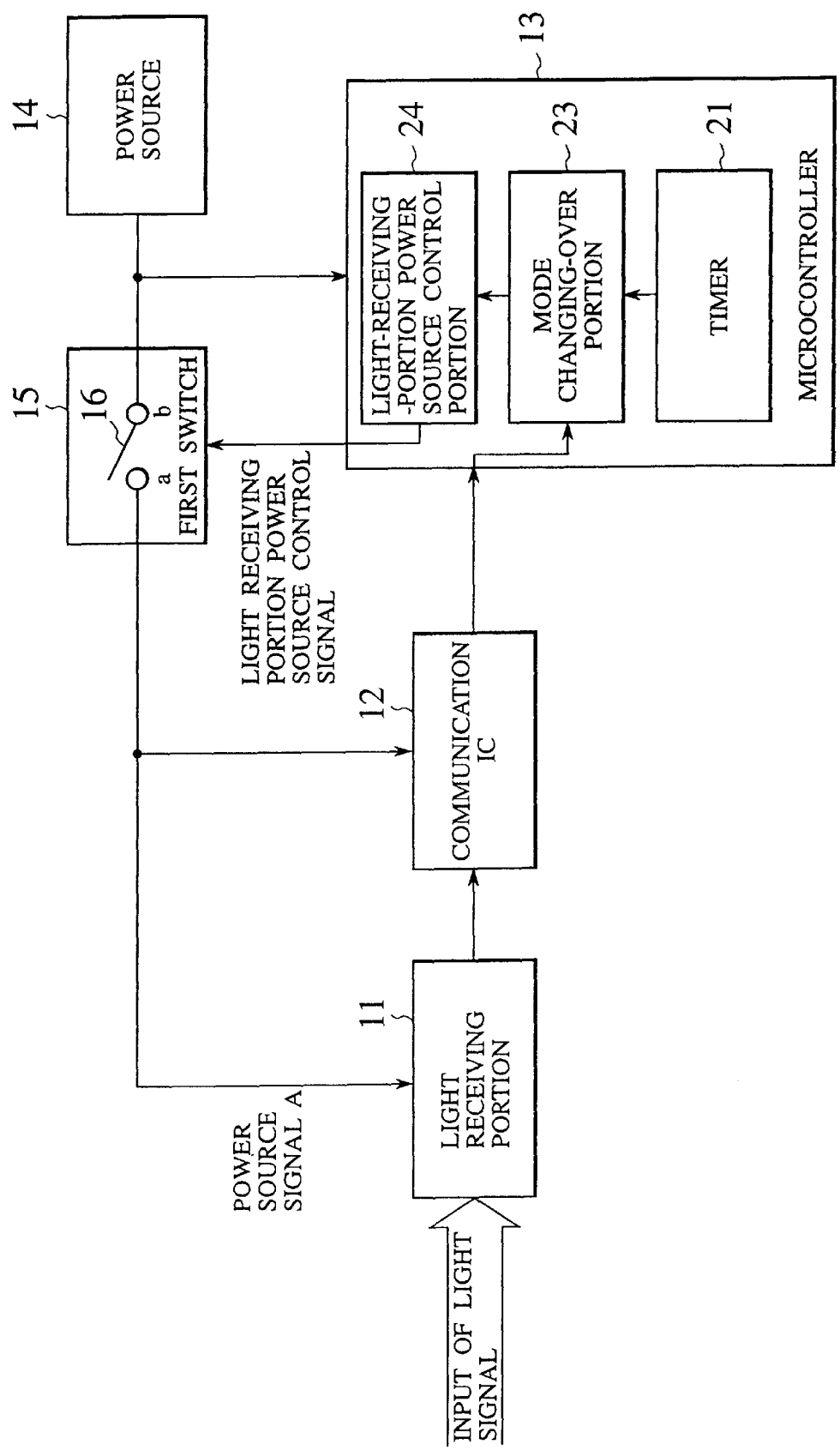
FIG. 3 is a detailed construction block diagram illustrating a control node that has been provided in an optical multiplex transmission apparatus according to a first embodiment of the present invention.
Figure 4:
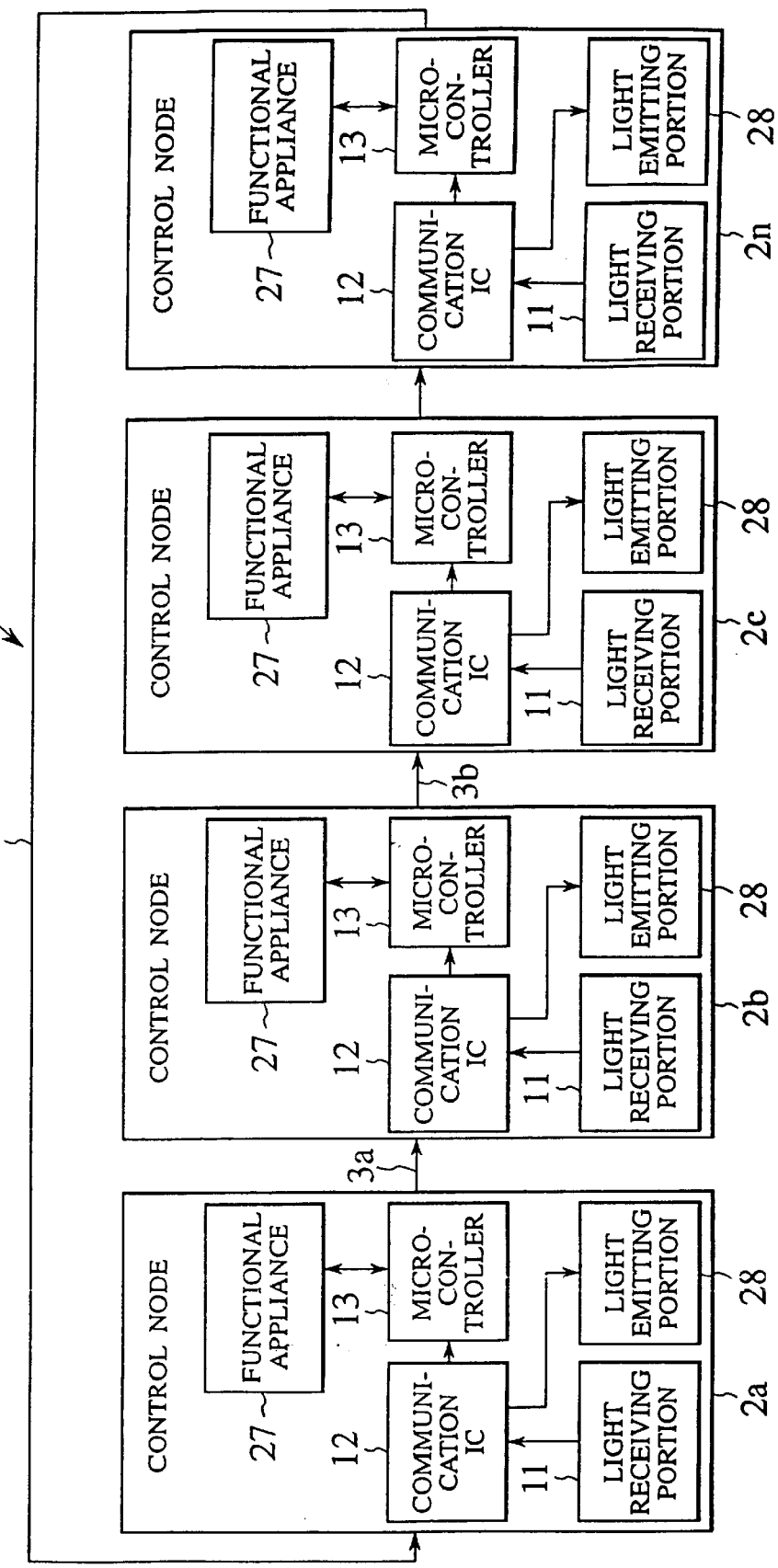
FIG. 4 is a construction block diagram illustrating the optical multiplex transmission apparatus according to a first embodiment of the present invention.

In FIG. 3, illustration is made of a detailed construction block diagram illustrating a control node that has been provided in an optical multiplex transmission apparatus according to a first embodiment of the present invention. In FIG. 4, illustration is made of a construction block diagram according to the first embodiment of the present invention.

In the optical multiplex transmission apparatus illustrated in FIG. 4, a plurality of control nodes 2a to 2n are connected to one another in the form of a ring by way of an optical multiplex transmission path 3 (3a to 3n) such as that consisting of an optical fiber and it is arranged that a multiplex communication signal, data, or command is transmitted in the direction indicated by the arrows. The control node 2a is, for example, a master node and sends out a command, signal, or data to every one of the control nodes 2b to 2n to thereby control each control node 2b to 2n. The control nodes 2b to 2n are slave nodes.

Each of the control nodes 2a to 2n has a light receiving portion 11, a communication integrated circuit (communication IC) 12, a microcontroller 13, a functional appliance 27, and a light emitting portion 28.

The light receiving portion 11 converts a light signal that it has received to an electric signal and outputs this signal to the communication IC 12. If the data that has been received by the light receiving portion 11 is one that has been delivered toward the communication IC 12, this IC 12 has this data taken therein. If the data that it has received is not one that is directed toward it, the IC 12 sends this data to the optical multiplex transmission path 3 as this data is. If there is data that is to be transmitted, the IC 12 sends this data to the optical multiplex transmission path 3. The communication IC has a for-use-in-multiplex-transmission interface portion that serves as a multiplex communication portion for multiplexing data and making transmission and reception thereof.

The microcontroller 13 can make a changeover between a sleep mode in which the multiplex communication portion (not illustrated) is kept inoperative and a multiplex communication mode in which multiplex communication is performed. The microcontroller 13 causes the multiplex communication potion to operate in either one of the modes, or controls the functional appliance 27 by a control signal. The functional appliance 27 is a cassette deck, CD, radio, amplifier, etc. The light emitting portion 28 converts an electric signal to a light signal and thereby sends this signal to the optical multiplex transmission path 3.

Each control node 2a to 2n is constructed in such a way that, in order that the current consumption thereof may be suppressed to a value that falls within a permissible range, the power source for the light receiving portion 11 is made "on" with a prescribed duty ratio, and that, when having received a light signal, the control node is activated from the sleep mode.

Therefore, as illustrated in a detailed view of FIG. 3, each control node 2a to 2n has the light receiving portion 11, the communication IC 12, the microcontroller 13, a power source 14, and a first switch 15. A voltage signal of the power source 14 is supplied directly to the microcontroller 13 and also to the first switch 15.

As illustrated in FIG. 3, the microcontroller 13 has a timer 21, mode changing-over portion 23, and light-receiving-portion power source control portion 24, and is arranged so that the sleep mode and the multiplex communication mode may be alternately repeated every prescribed period of time. The timer 21 manages the prescribed length of time. The mode changing-over portion 23, when the communication IC 12 is in sleep mode, causes a changeover of the mode from the sleep mode to the multiplex communication mode when the prescribed length of time that has been managed by the timer 21 has lapsed.

When the mode has been changed over to the multiplex communication mode by the mode changing-over portion 23, the light-receiving-portion power source control portion 24 outputs, in order to supply the voltage signal of the power source 14 to the light receiving portion 11, for example, a high level light-receiving-portion power source control signal during, and by, a prescribed time length, (i.e., power source supply time length), to the first switch 15. The light-receiving-portion power source control portion 24 and the first switch 15 constitute a light reception control portion.

When the mode has been changed over from the sleep mode to the multiplex communication mode and a light signal has been input, the mode changing-over portion 23 causes the continuation of the multiplex communication mode and, on the other hand, the light-receiving-portion power source control portion 24 causes the continuation of the supply of the power source to the light receiving portion 11, thereby causing an activation of the control node from the sleep mode without providing a wake-up signal electric wire.

When no light signal is input, before the changeover from the multiplex communication mode to the sleep mode, the light-receiving-portion power source control portion 24 outputs, in order to make "off" the supply of the voltage signal of the power source 14 to the light receiving portion 11 and communication IC 12, for example, a low level light-receiving-portion power source control signal to the first switch 15 during, and by, a prescribed length of time (i.e., the power source non-supply time length).

The first switch 15 has a terminal a, a terminal b, and a contact piece 16, and, upon receipt of the light-receiving-portion power source control signal from the light-receiving-portion power source control portion 24, makes a contact ("one") or a non-contact ("off") of the contact piece 16 with the terminal a in correspondence with the light-receiving-portion power source control signal, and thereby obtains a power source signal A from the voltage of the power source 14 and supplies this power source signal A to the light receiving portion 11 and communication IC 12.

The power source signal A is a signal whose period T consists of an "off" time length $T_{off}$ and an "on" time length $T_{on}$. The duty ratio between the "off" time length $T_{off}$ and the "on" time length $T_{on}$ is set so that the current consumption in the sleep mode may fall within a predetermined permissible range of power consumption.

The current consumption is at, for example, 40 mA when the power source is kept "on" and is at, for example, 0.5 mA when the power is kept "off". If the duty ratio is set to be 1 ("on" time length):100 ("off " time length), the current consumption is 0.9 mA, which falls within a current consumption range of 1.0 mA, that is a standard for sleep mode.

Figure 5:
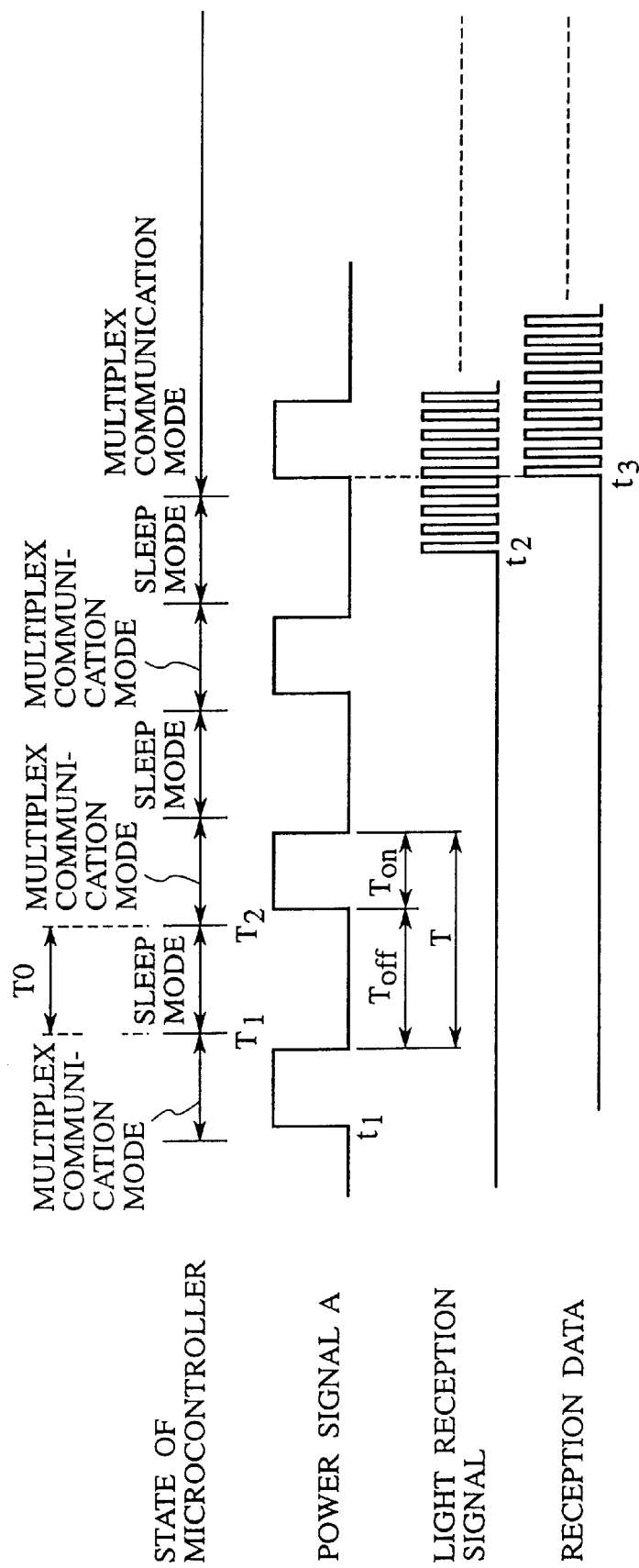
FIG. 5 is a timing chart of respective signals in the control node according to the first embodiment.
Figure 6:
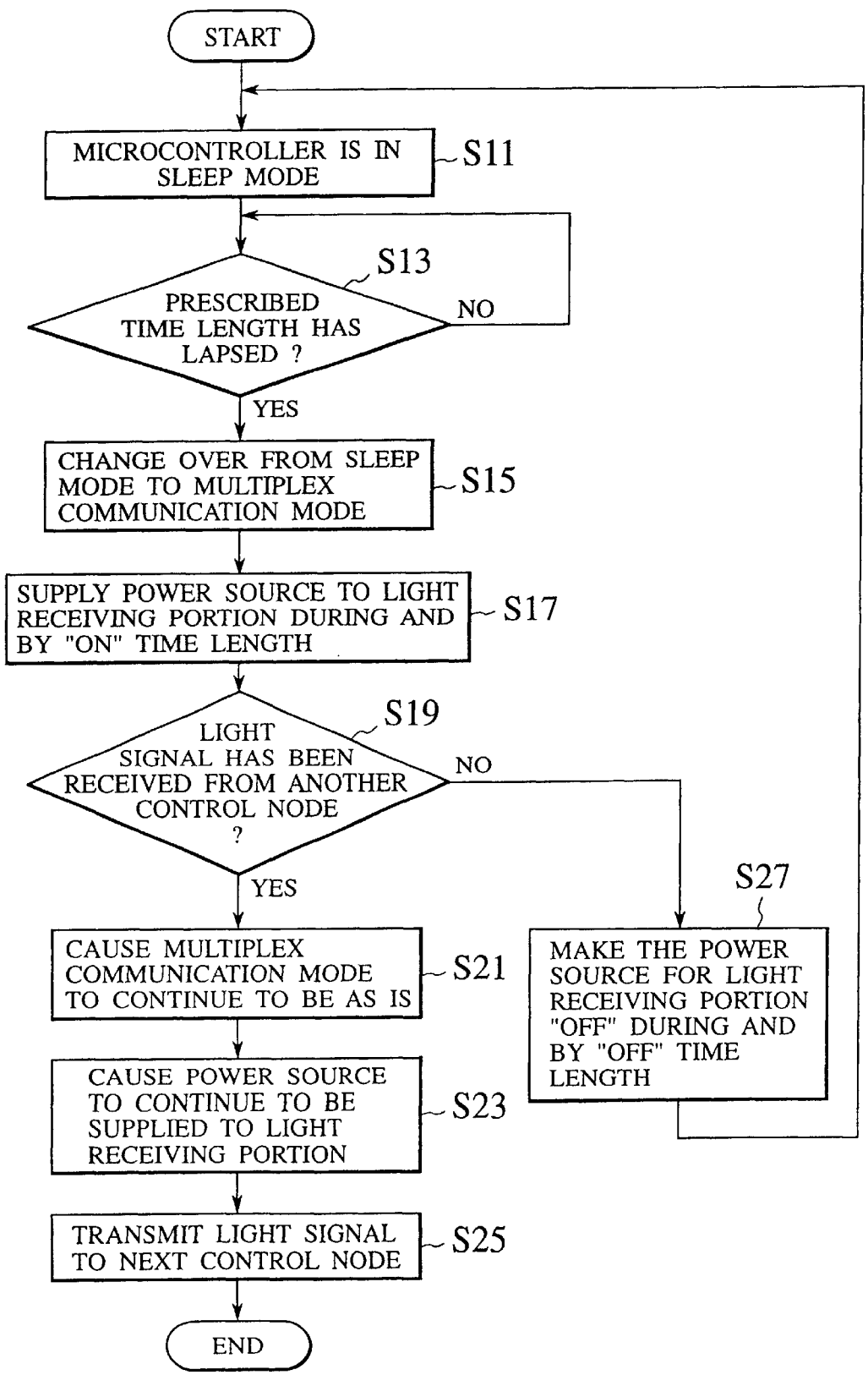
FIG. 6 is a flow chart illustrating the operation of the control node according to the first embodiment.

Next, the operation of the above-constructed optical multiplex transmission apparatus, i.e., the optical multiplex transmission method will be explained in detail with reference to FIG. 6. Here, it is assumed that, as illustrated in FIG. 5, the microcontroller 13 alternately repeats the multiplex communication and the sleep mode every prescribed period of time. Also, it is assumed that the "off" time length $T_{off}$ is set to be larger than a prescribed time length $T_0$ and the "on" time length $T_{on}$ is set to be smaller than the prescribed time length $T_0$.

Here, initially, in each control node 2a to 2n, it is assumed that the microcontroller 13 is in a state of sleep mode (step 11). Then it is determined using the timer 21 whether the prescribed time length $T_0$ has lapsed from the point in time when the microcontroller 13 has come into the sleep mode (step S13).

When a prescribed time length has lapsed from the point in time when having come into the sleep mode, for example, when in FIG. 5 the prescribed time length To has lapsed to reach a time $T_2$ from a time $T_1$, the mode changing-over portion 23 changes over the mode from the sleep mode to the multiplex communication mode (step S15).

The light-receiving-portion power source control portion 24 outputs to the first switch 15, for example, a high-level light-receiving portion power source control signal for supplying the power source 14 to the light receiving portion 11, during, and by, the "on" time length $T_{on}$, according to the multiplex communication mode to which the mode has been changed over by the mode changing-over portion 23.

Accordingly, the first switch 15 makes its "on" operation by having its contact piece 16 contacted with the terminal a in correspondence with the high-level light-receiving-portion power source control signal, and thereby supplies the power source 14 to the light receiving portion 11 and communication IC 12 during, and by, the "on" time length $T_{on}$ (step S17). Namely, the power source 14 is supplied to the light receiving portion 11 and the communication IC 12 during, and by, the "on" time length $T_{on}$ within the period T of the power source signal A.

Next, the mode changing-over portion 23 determines through the light receiving portion 11 and communication IC 12 whether a light signal has been received from another control node (step Sl9). Where having received a light signal (a light reception signal), the mode changing-over portion 23 causes the continuation of the multiplex communication mode (step S21). Namely, where the microcontroller 13 is in a state of multiplex communication mode and where a light signal has been received, the multiplex communication mode is caused to continue to be as is.

Further, the light-receiving-portion power source control portion 24 continuously outputs the high-level light-receiving-portion power source control signal to the first switch 15 in correspondence with the multiplex communication mode to which the mode has been changed over by the mode changing-over portion 23. Accordingly, the first switch 15 continues to make its "on" operation according to the high-level light-receiving-portion power source control signal and thereby continues to supply the power source to the light receiving portion 11 and communication IC 12 (step S23). Namely, when reception has been made of a light signal, the first switch 15 continues to supply the power source to the light receiving portion 11 and communication IC 12 so as to cause multiplex communication.

The relevant control node that has been started from the sleep mode transmits the light signal to the next control node through the light emitting portion 28 (step S25). The next control node also performs the above-described processing and in this way all the control nodes in the form of a ring are activated from the sleep mode with the result that a ring network is established. Therefore, it is possible to commence the multiplex communication within the network.

On the other hand, when in step S19 no light signal is received from another control node, the mode changing-over portion 23 sends a power source "off" instruction signal to the light-receiving-portion power source control portion 24 before changing over the mode from the multiplex communication mode to the sleep mode.

Then, the light-receiving portion power source control portion 24 outputs a low-level light-receiving-portion power source control signal for stopping the supply of the power source to the light receiving portion 11 and communication IC 12 from the power source 14, to the first switch 15 according to the power source "off" instruction signal from the mode changing-over portion 23.

Accordingly, the first switch 15 is made "off" by having its contact piece 16 separated from the terminal a according to the low-level light-receiving-portion power source control signal to thereby stop the supply of the power source to the light receiving portion 11 and communication IC 12 during, and by, the "off" time length $T_{off}$ (step S27). Namely, the power source 14 ceases to be supplied to the light receiving portion 11 and communication IC 12 during, and by, the "off" time length $T_{off}$ within the period T of the power source signal A. Thereafter, the mode changing-over portion 23 changes over the mode from the multiplex communication mode to the sleep mode and the flow returns to step S11 from step S27.

Similarly, as illustrated in FIG. 5, where at the time $t_2$ during the sleep mode a light signal has been input, because the power source signal A is in an "off" state, no reception can be made of the light signal. Then at the point in time when the mode is changed over from the sleep mode to the multiplex communication mode and the power source 14 has been supplied to the light receiving portion 11 at a time $t_3$, the light receiving portion 11 can receive reception data. Thereafter, where reception data continues to be sent on, the multiplex communication mode continues to be as is, whereby the supply of the power source to the light receiving portion 11 continues to be made. The processing that has been above performed until this corresponds to the processing from step S11 to step S23 in FIG. 6.

In this way, according to the optical multiplex transmission apparatus of the first embodiment, the microcontroller 13 has alternately repeated therein the multiplex communication mode and the sleep mode every prescribed period of time and supplies the power source 14 to the light receiving portion 11 and communication IC 12 with a prescribed duty ratio. Therefore, the current consumption at the time of the sleep mode is suppressed to a value that falls within a permissible range.

Further, when the mode of the microcontroller has been changed over from the sleep mode to the multiplex communication mode and a light signal has been input, the microcontroller causes the multiplex communication mode thereof to continue to be as is and causes the power source to continue to be supplied to the light receiving portion 11, whereby it is possible to activate the system from the sleep mode.

Accordingly, since a multiplex communication signal is transmitted by way of the optical multiplex transmission path 3 and, at the time of activation, a signal is transmitted also by way of the optical multiplex transmission path 3, it becomes unnecessary to provide a wake-up signal electric wire separately from the optical multiplex transmission path 3 that is a data transmission line. This makes it possible to simplify the system.

Furthermore, since a plurality of the control nodes are connected to one another in the form of a ring by means of the optical multiplex transmission path 3, even when part of this optical multiplex transmission path 3 is broken, all the control nodes can be activated by transmitting a wake-up signal in both the forward and opposite directions.

Second Embodiment

Next, the optical multiplex transmission apparatus and optical multiplex transmission method according to a second embodiment of the present invention will be explained.

In the optical multiplex transmission apparatus according to the first embodiment, not only the power for the light receiving portion 11 but also the power for the communication IC 12 is made "on" or "off" with a certain value of duty ratio. Namely, the power source signal A is supplied to both the light receiving portion 11 and the communication IC 12. For this reason, the current consumption becomes increased.

Figure 8:
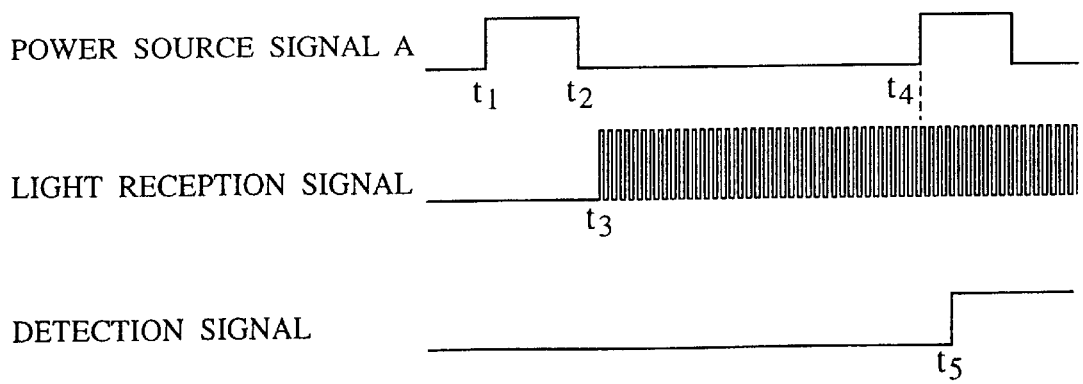
FIG. 8 is a timing chart illustrating the activation responsivity in the control node according to -the first embodiment.

On this account, in order to suppress the current consumption value at the time of sleep mode to a value that is defined under the "standard", it is considered, as illustrated in FIG. 8, to make small the value of the duty ratio (the ratio of the "on" time length to the "off" time length) between the "on" and the "off" of the power source signal A. However, making the duty ratio value small, the "off" time length becomes long.

Even when as illustrated in FIG. 8 a light signal has been input at a time $t_3$ within the "off" time length from a time $t_2$ to a time $t_4$, since the power source is being made "off" during a time length that is covered from the time $t_2$ to the time $t_4$, no detection can be made of any light reception signals. In this case, at the time $t_4$, the power source is made "on", and, at a time $t_5$ immediately thereafter, a light reception signal is detected as a detection signal. Therefore, the smaller the value of the duty ratio is made and the longer the "off" time length becomes, the more deteriorated the activation responsivity of the system becomes.

In addition, where constructing a ring network as in the case of the optical multiplex transmission apparatus of the first embodiment, each control node is sequentially activated from the sleep mode. Therefore, the activation responsivity of the individual control nodes reflects itself as the activation responsivity of the entire network. Therefore, the activation responsivity of the entire network becomes appreciably deteriorated.

On this account, the optical multiplex transmission apparatus and optical multiplex transmission method of the second embodiment are those which have been improved from the optical multiplex transmission apparatus and optical multiplex transmission method of the first embodiment in terms of the activation responsivity thereof.

Figure 7:
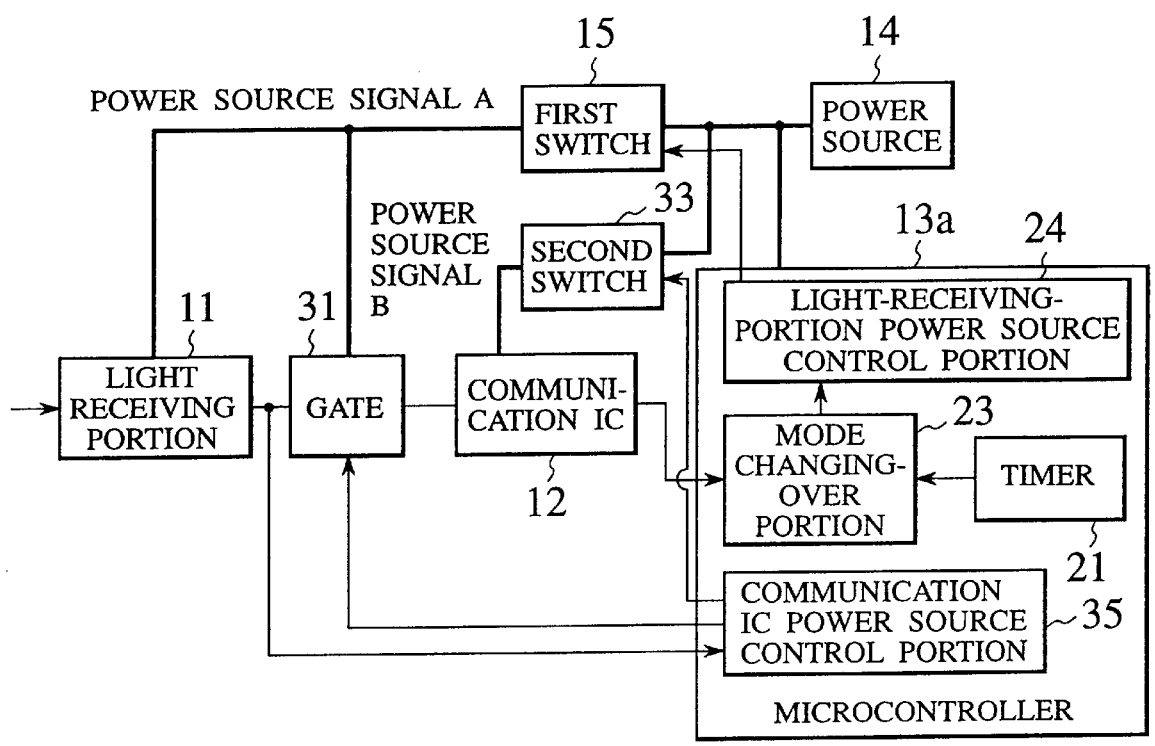
FIG. 7 is a detailed construction block diagram illustrating a control node that has been provided in an optical multiplex transmission apparatus according to a second embodiment of the present invention.

In FIG. 7, illustration is made of a detailed construction block diagram of the control node that has been provided in the optical multiplex transmission apparatus of the second embodiment. Each control node is constructed of a light receiving portion 11, a communication IC 12, a microcontroller 13a, a power source 14, a first switch 15, a gate 31 provided between the light receiving portion 11 and the communication IC 12, and a second switch 33. The microcontroller 13a is constructed of a timer 21, a mode changing-over portion 23, a light-receiving-portion power source control portion 24, and a communication IC power source control portion 35.

The power source signal A is being always supplied from the first switch 15 to the light receiving portion 11. The gate 31 is, for example, a for-use-in-protection low-current-consumption CMOS-structured gate. To this gate 31 there is being always supplied the power source signal A from the first switch 15.

The communication IC power source control portion 35 determines whether a light signal has been input from the light receiving portion 11. Where no light signal has been input thereto, this portion 35 outputs an "off" instruction signal to the gate 31 and to the second switch 33, thereby causing the "off" operation of the gate 31 and second switch 33.

On the other hand, when a light signal has been input from the light receiving portion 11, the communication IC power source control portion 35 outputs an "on" instruction signal to the gate 31 and to the second switch 33 in synchronism with the "on" time at which the power source signal A is "on", thereby causing the "on" operation of the gate 31 and the second switch 33. The communication IC power source control portion 35, gate 31, and second switch 33 constitute the multiplex communication control portion.

It is to be noted that the portions illustrated in FIG. 3 that are the same as those illustrated in FIG. 3 are denoted by like reference numerals, and a detailed explanation thereof is omitted here because it was already made in the first embodiment. It is also to be noted that in FIG. 7 thick lines indicate power source lines and thin lines indicate signal lines.

Figure 9:
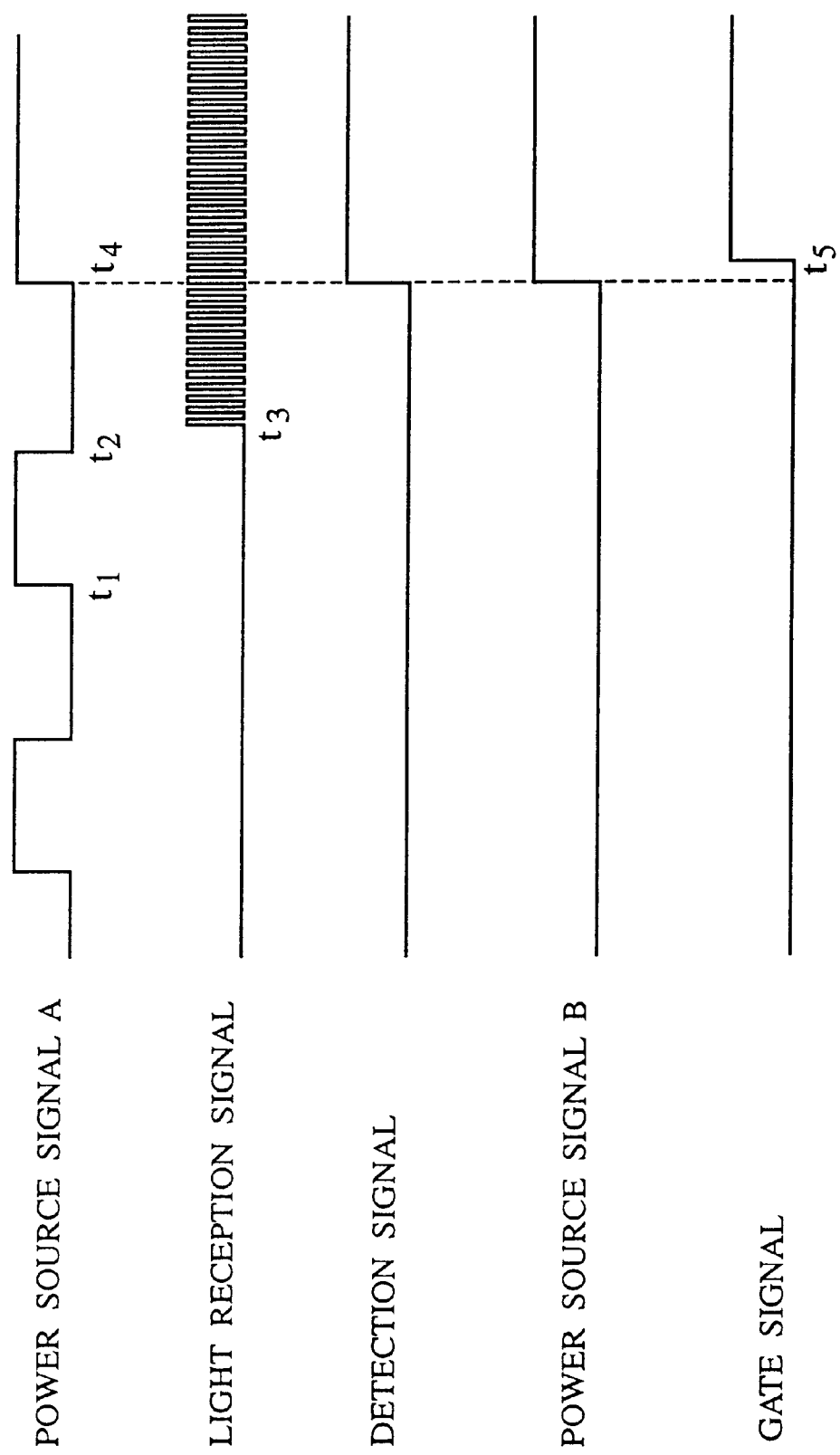
FIG. 9 is a timing chart illustrating the activation responsivity in the control node according to the second embodiment.

FIG. 9 is a timing chart illustrating the activation responsivity in the control node according to the second embodiment. Next, the operation of the control node according to the second embodiment will be explained with reference to FIG. 9.

First, before a time $t_3$, the sleep mode and the multiplex communication mode are alternately repeated every prescribed period of time, whereby the power source signal A that is repeatedly "on" and "off" is supplied to the light receiving portion 11 and to the gate 31. In this state, since the light receiving portion 11 is receiving no light signal, the communication IC power source control portion 35 outputs the "off" instruction signal to the gate 31 and to the second switch 33, with the result that the gate 31 and the second switch 33 make their "off" operation.

Accordingly, since no current is caused to flow into the communication IC 12, it is possible to largely decrease the current consumption in a state prior to the activation that is caused from the sleep mode. As a result, the duty ratio between the "on" time length and the "off" time length can be made large in value by the extent to which the current consumption could be decreased, and as a result the activation responsivity becomes excellent. Namely, even in the system having provided therein the communication IC 12 whose current consumption is large, it is possible to ensure the activation responsivity that is the same in extent as the activation responsivity of the system having provided therein no communication IC 12.

In addition, in the ring type network, while each control node is sequentially activated from the sleep mode, there is also the advantage that if the activation responsivity of each of the individual control node is improved, the activation responsivity of the entire network also becomes improved.

Next, when a light signal has been input at the time $t_3$, the communication IC power source IC power source control portion 35 outputs an "on" instruction signal to the gate 31 and to the second switch 33 in synchronism with a time $t_4$ at which the power source signal A is "on", and therefore the gate 31 an the second switch 33 make their "on" operation.

Accordingly, to the communication IC 12, a power source signal B from the power source 14 is supplied through the second switch 33. In addition, since the gate 31 is made "on", the light receiving portion 11 and the communication IC 12 are conducted to each other, with the result that reception data are sent from the communication IC 12 to the microcontroller 13a. As a result of this, the control node can perform its multiplex communication by being activated from the sleep mode.

Incidentally, the present invention is not limited to the above-described first and second embodiments. The construction of the optical multiplex transmission apparatus is not limited to a ring-like network, and may be of a bus type network that has been constructed by a plurality of control nodes being connected to a common bus.

More generally, it should be understood that many modifications and adaptations of the invention will become apparent to those skilled in the art and it is intended to encompass such obvious modifications and changes in the scope of the claims appended hereto.

What is claimed is:

1. An optical multiplex transmission apparatus wherein a plurality of control nodes are connected to an optical multiplex transmission path; and each control node performs communication, through a multiplex communication portion for use in multiplex transmission that has been provided therein, with another control node, the each control node comprising:

a light receiving portion that operates by having a power source signal supplied thereto and receives an optical signal from the another control node;

a mode changing-over portion that alternately changes over the mode of the control node between a multiplex communication mode for performing multiplex communication and a sleep mode in which the multiplex communication portion is kept inoperative every prescribed period of time; and a light reception control portion that has alternately repeated therein a power source supply time length corresponding to the multiplex communication mode during which the power source is supplied and a power source non-supply time length corresponding to the sleep mode during which the power source is not supplied, and that produces a power source supply pulse signal wherein a duty ratio between the power source supply time length and the power source non-supply time length is preset and supplies the power source supply pulse signal to the light receiving portion, whereby when the mode changing-over portion changes over the mode of the control node from the sleep mode to the multiplex communication mode and the light receiving portion has received a light signal, the mode changing-over portion causes the multiplex communication mode to be maintained while the light signal is being received, and the light reception control portion causes the power source to continue to be supplied to the light receiving portion while the light signal is being received.

2. An optical multiplex transmission apparatus according to claim 1, wherein after the mode changing-over portion has changed over the mode of the control node from the sleep mode to the multiplex communication mode, the light reception control portion supplies the power source to the light receiving portion during, and by, the power source supply time length according to the power source supply pulse signal.

3. An optical multiplex transmission apparatus according to claim 1, wherein upon receiving no light signal from the other control node, the light reception control portion, before change-over from the multiplex communication mode to the sleep mode, stops the supply of the power source to the light receiving portion during, and by, the power source non-supply time length according to the power source supply pulse signal.

4. An optical multiplex transmission apparatus according to claim 1, further comprising a multiplex communication control portion which determines whether the light receiving portion has received the light signal and, when the light signal has been received thereby, causes the supply of the power source to the multiplex communication portion and, when no light signal has been received thereby, stops the supply of the power source to the multiplex communication portion.

5. An optical multiplex transmission apparatus according to claim 4, wherein:
   the multiplex communication control portion comprises:
   a reception determining portion for determining whether the light receiving portion has received the light signal;
   a switch for, when the light receiving portion has received the light signal, permitting the supply of the power source to the multiplex communication portion according to a control signal from the reception determining portion; and
   a gate for, when the light receiving portion has received the light signal, permitting the light signal output from the light receiving portion to be input to the multiplex communication portion according to the control signal from the reception determining portion.

6. An optical multiplex transmission apparatus according to claim 1, wherein the plurality of the control nodes are connected to one another by the optical multiplex transmission path in the form of a ring.

7. An optical multiplex transmission method wherein a plurality of control nodes are connected to an optical multiplex transmission path; and each control node performs communication, through a multiplex communication portion for use in multiplex transmission that has been provided therein, with another control node, the method comprising the steps of:
   alternately changing over the mode of the control node between a multiplex communication mode for performing multiplex communication and a sleep mode in which the multiplex communication portion is kept inoperative every prescribed period of time;
   alternately repeating a power source supply time length corresponding to the multiplex communication mode during which the power source is supplied and a power source non-supply time length corresponding to the sleep mode during which the power source is not supplied, and producing a power source supply pulse signal wherein the duty ratio between the power source supply time length and the power source non-supply time length is preset and supplying the power source supply pulse signal to a light receiving portion; and
   causing a continuation of the multiplex communication mode during a reception of the light signal and causing a continuation of the supply of the power source to the light receiving portion during the reception of the light signal, when the mode of the control node has been changed over from the sleep mode to the multiplex communication mode and the light receiving portion has received the light signal.

8. An optical multiplex transmission method according to claim 7, wherein the mode of the control node has been changed from the sleep mode to the multiplex communication mode, the power source is supplied to the light receiving portion during, and by, the power source supply time length according to the power source supply pulse signal.

9. An optical multiplex transmission method according to claim 7, wherein when the light receiving portion receives no light signal from the other control node, the supply of the power source to the light receiving portion is stopped during, and by, the power source non-supply time length according to the power source supply pulse signal before change-over from the multiplex communication mode to the sleep mode.

10. An optical multiplex transmission method according to claim 7 wherein a determination is made of whether the light receiving portion has received the light signal and, when the light signal has been received thereby, the supply of the power source to the multiplex communication portion is made and, when no light signal has been received thereby, the supply of the power source to the multiplex communication portion is stopped.

11. An optical multiplex transmission method according to claim 10, wherein, when the light signal has been received, the light signal output from the light receiving portion is input to the multiplex communication portion.

12. An optical multiplex transmission method according to claim 7, wherein the plurality of the control nodes are connected to one another by the optical multiplex transmission path in the form of a ring.

* * * * *